United States Patent
Washnock et al.

(10) Patent No.: US 9,346,490 B2
(45) Date of Patent: May 24, 2016

(54) TAPERED INVOLUTE SECTOR GEAR AND VARIABLE RATIO RACK RECIRCULATING-BALL STYLE STEERING GEARBOX

(71) Applicant: FORD GLOBAL TECHNOLOGIES, LLC, Dearborn, MI (US)

(72) Inventors: Joseph Washnock, Canton, MI (US); Jackson E. Barry, Jr., Dearborn, MI (US); Dale Killins, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 127 days.

(21) Appl. No.: 14/055,163

(22) Filed: Oct. 16, 2013

(65) Prior Publication Data

US 2015/0101436 A1  Apr. 16, 2015

(51) Int. Cl.
*F16H 27/02* (2006.01)
*B62D 5/24* (2006.01)
*B62D 3/08* (2006.01)
*F16H 55/26* (2006.01)

(52) U.S. Cl.
CPC .. *B62D 5/24* (2013.01); *B62D 3/08* (2013.01); *F16H 55/26* (2013.01); *Y10T 74/1967* (2015.01); *Y10T 74/19949* (2015.01)

(58) Field of Classification Search
CPC .............. B62D 3/10; B62D 3/02; B62D 3/08; F16H 1/16; F16H 1/163; F16H 1/166; F16H 1/203; F16H 55/0806; F16H 55/0813; F16H 55/082
USPC ........................................................ 74/89.14
See application file for complete search history.

(56) References Cited

U.S. PATENT DOCUMENTS

| | | | | |
|---|---|---|---|---|
| 1,973,185 A | * | 9/1934 | Trbojevich | F16H 55/08 74/458 |
| 2,930,248 A | * | 3/1960 | Wildhaber | 74/459.5 |
| 2,953,932 A | * | 9/1960 | Lincoln | 74/388 PS |
| 3,060,762 A | * | 10/1962 | Lutz | 74/499 |
| 3,060,765 A | * | 10/1962 | Rinsoz | 475/252 |
| 3,267,763 A | * | 8/1966 | Merritt | B62D 3/12 74/422 |
| 3,289,489 A | * | 12/1966 | Georgiev | 74/427 |
| 3,310,990 A | * | 3/1967 | Zettel | 74/409 |
| 3,486,394 A | * | 12/1969 | Heidrich | 74/458 |
| 3,500,700 A | * | 3/1970 | Matsuda | 74/498 |
| 3,661,031 A | * | 5/1972 | Mizukoshi et al. | 74/462 |
| 3,753,378 A | * | 8/1973 | Bishop | B62D 3/12 74/422 |
| 4,011,764 A | * | 3/1977 | Buck et al. | 74/499 |
| 4,175,404 A | * | 11/1979 | Schopf | 464/158 |
| 4,255,980 A | * | 3/1981 | Yanai | 74/388 PS |
| 4,444,070 A | * | 4/1984 | Yanai | B62D 3/123 74/422 |
| 4,565,474 A | | 1/1986 | Charles | |

(Continued)

FOREIGN PATENT DOCUMENTS

CN            202883948 U    10/2013

*Primary Examiner* — James English
(74) *Attorney, Agent, or Firm* — Raymond L. Coppiellie; Brooks Kushman P.C.

(57) ABSTRACT

A recirculating-ball style gearbox for a vehicle steering system is provided. The gearbox has a rack with rack-teeth that are capable of providing variable ratio steering, where the rack-teeth are in mesh with the involute-teeth of a tapered sector gear. The involute-teeth of the sector gear have arrays of helical meshing lines extending across the meshing surfaces of the teeth, wherein the array of helical meshing lines have leads that decrease in length moving radially outward across the meshing surfaces.

17 Claims, 5 Drawing Sheets

(56) References Cited

U.S. PATENT DOCUMENTS

| | | | |
|---|---|---|---|
| 4,651,588 A * | 3/1987 | Rouverol | F16H 55/0806 74/462 |
| 5,941,124 A * | 8/1999 | Tan | 74/409 |
| 6,374,693 B1 * | 4/2002 | Kawabe et al. | 74/499 |
| 6,543,569 B1 * | 4/2003 | Shimizu | B21K 1/767 180/444 |
| 8,225,691 B2 * | 7/2012 | Kobayashi | 74/459.5 |
| 2005/0204845 A1 * | 9/2005 | Yun | 74/388 PS |
| 2012/0225743 A1 * | 9/2012 | Ishii | F16H 7/0848 474/110 |
| 2014/0208894 A1 * | 7/2014 | Miller | 74/665 G |
| 2014/0311263 A1 * | 10/2014 | Washnock et al. | 74/89.23 |
| 2014/0318289 A1 * | 10/2014 | Tanaka et al. | 74/89.14 |
| 2015/0082930 A1 * | 3/2015 | Okamoto | 74/458 |

* cited by examiner

TAPERED INVOLUTE SECTOR GEAR AND VARIABLE RATIO RACK RECIRCULATING-BALL STYLE STEERING GEARBOX

TECHNICAL FIELD

This invention relates to a recirculating-ball style steering system, and more specifically to a recirculating-ball style steering gearbox having a tapered involute sector gear meshing with a variable ratio rack.

BACKGROUND

Recirculating-ball style steering systems are used on many types of automobiles, typically on heavier vehicles such as trucks and sport utility vehicles. The recirculating-ball style steering system usually consists of a gearbox that houses a worm gear that is rotatably linked to a steering wheel on one end and is connected to a ball-nut rack on the other end. The worm gear is similar to a ball screw, the threads are filled with ball bearings that recirculate through the worm gear and ball-nut rack as the worm gear turns. The ball bearings are used to reduce friction and unwanted excess clearance between the worm gear and the ball-nut rack. The ball-nut rack includes a set of rack-teeth that are in mesh with a sector gear, having involute-teeth. A sector shaft may extend from the sector gear and be rotatably linked to a pitman arm, which may in turn be connected to other steering components to steer road wheels of the automobile. When the steering wheel is rotated, the worm gear also rotates which moves the ball-nut rack in a linear direction. The recirculating-ball style gearbox provides a mechanical advantage from the steering wheel to the steerable road wheels. The rack-teeth of the ball-nut rack in turn rotate the sector gear and sector shaft. The rotation of the sector shaft in turn rotates the pitman arm, the pitman arm moves a track rod and set of tie rods which rotate steerable road wheels of the automobile.

Variable ratio steering has been employed in recirculating-ball style steering systems. Variable ratio steering means that the ratio between the rotation of steering wheel and the rotation of the steerable road wheels is not held constant throughout the entire rotation of the steering wheel. Depending on the position of the steering wheel, the road wheels may be more or less sensitive to rotation of the steering wheel. Typically in a recirculating-ball style steering system having variable ratio steering, the steering ratio is higher closer to the maximum turning positions (left or right) than when the steering wheel is in a neutral position and the road wheels are straight. The purpose of the variable ratio steering is to create greater mechanical advantage for the driver and reduce steering sensitivity when the steering wheel is close to its maximum turning positions. This lowers hand wheel parking efforts and gives the operator greater control while parallel parking, which is essential in large trucks and sport utility vehicles.

Recirculating-ball style steering systems have also utilized sector gears having involute-teeth that are tapered, but not in combination with variable ratio racks. Tapered involute-teeth increase the precision, convenience, and cost-effectiveness of setting the initial gear mesh load and mesh load maintenance throughout the life of the gear. Because of the tapered feature of the teeth, the sector gear can be adjusted in the longitudinal direction of the sector shaft to set and adjust the mesh load, which is a fairly simple procedure. On the other hand, setting mesh loads for recirculating-ball style steering systems with straight non-tapered sector teeth is cumbersome, expensive, and lacks the ability for future adjustments.

Tapered sector gears, however, have not been compatible with variable ratio racks. The tapered involute-teeth of the sector gears have had interference issues with variable ratio rack-teeth at the lower end of the tooth taper and gap issues at the upper end of the tooth taper.

It would be desirable to provide a recirculating-ball style steering system that includes both a variable ratio ball-nut rack and a tapered sector gear, to allow for variable ratio steering, precise and cost effective setting of initial gear mesh load, and the ability for future adjustment of the mesh load during the life of the vehicle.

SUMMARY

In one aspect of the disclosure, a recirculating-ball style gearbox for a vehicle steering system having a variable ratio rack in mesh with a tapered sector gear is provided. The gearbox has a rack with rack-teeth that are capable of providing variable ratio steering, where the rack-teeth are in mesh with the involute-teeth of a tapered sector gear. The involute-teeth of the sector gear have arrays of helical meshing lines extending across the meshing surfaces of the teeth, wherein the array of helical meshing lines have leads that decrease in length moving radially outward across the meshing surfaces. The meshing load between the tapered sector gear and the rack is modifiable by adjusting the position of the sector gear longitudinally. In the vehicle steering system, the linear movement of the rack is rotatably linked to the steering wheel of a vehicle via a ball-nut while the tapered sector gear is pivotally linked to steerable road wheels of an automobile.

In another aspect of the disclosure, a sector gear having tapered involute teeth capable of meshing with a variable ratio rack in a recirculating-ball steering system is provided. The sector gear has at least one tapered involute tooth that has a meshing surface that is capable of contacting the teeth of a variable ratio rack along an array of helices, where the helices have leads that decrease in length moving radially outward across the meshing surface. The meshing load between the sector gear and the rack is modifiable by adjusting the position of the sector gear longitudinally.

In yet another aspect of the disclosure, a steering gearbox is provided having a tapered sector gear in mesh with a concave meshing surface of a rack. The gearbox includes a rack that has at least one rack-tooth with a concave meshing surface on one side of the tooth and a convex meshing surface on another side of the tooth. The gearbox also include a tapered sector gear having at least one involute-tooth with a first tooth thickness at a first pitch circle adjacent a first side of the tooth larger than a second tooth thickness at a second pitch circle adjacent a second side of the tooth. The at least one involute-tooth of the sector gear has an array of helical meshing lines extending across a sector tooth meshing surface, wherein the array of helical meshing lines have leads that decrease in length moving radially outward across the sector tooth meshing surface. The meshing load between the tapered sector gear and the rack is modifiable by adjusting the position of the sector gear longitudinally.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
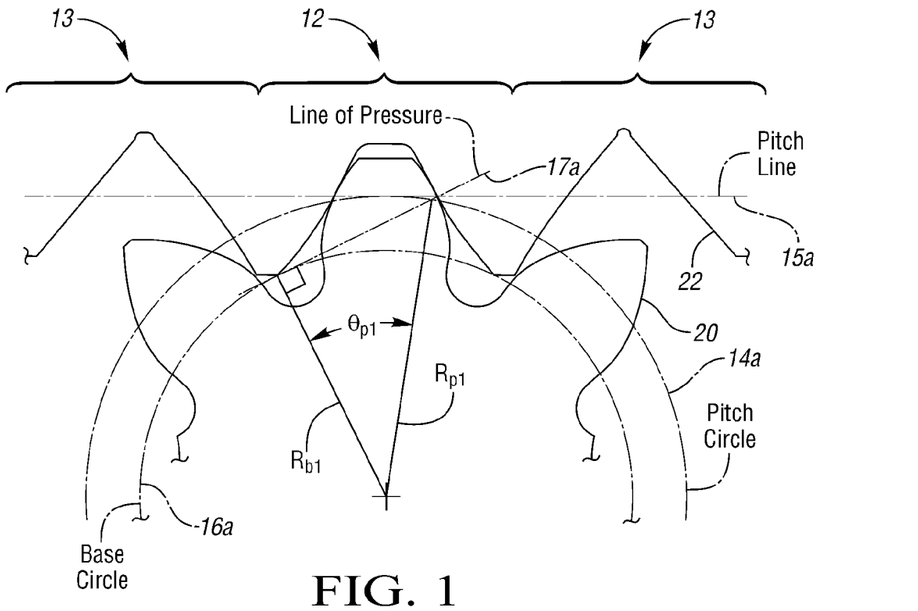
FIG. 1 is diagram illustrating the radius of the pitch circle of a sector gear relative to the pressure angle when a steering wheel is in a neutral position and road wheels are straight.
Figure 2:
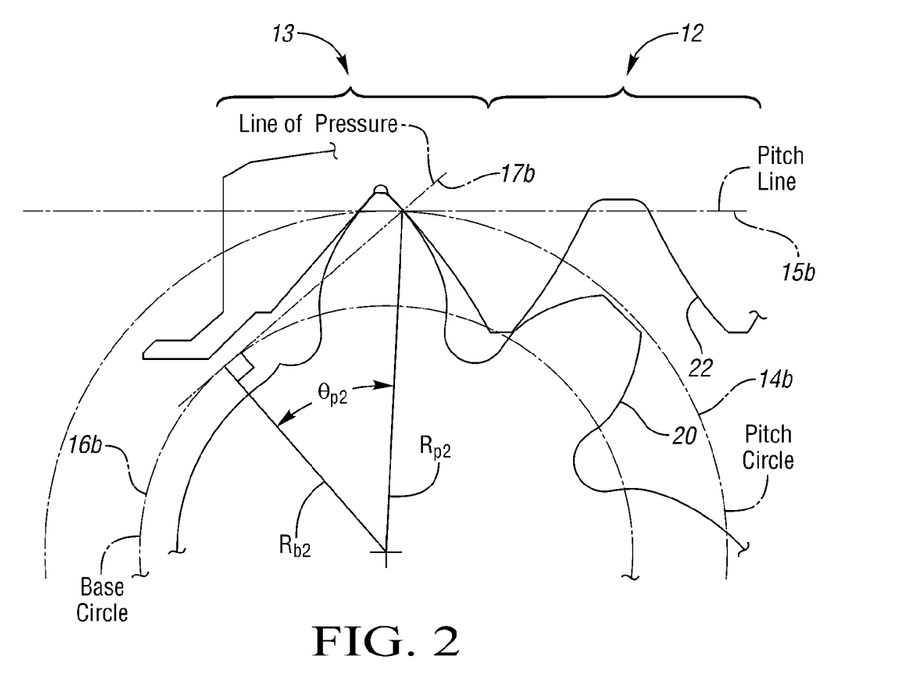
FIG. 2 is diagram illustrating the radius of the pitch circle of a sector gear relative to the pressure angle when a steering wheel and road wheels are near a maximum turning position.

FIGS. 1 and 2 illustrate a variable ratio between a sector gear 20 and a variable ratio rack 22 combination. FIG. 1 shows the sector gear 20 in mesh with a center section 12 of the variable ratio rack 22. FIG. 2 shows the sector gear 20 in mesh with an outer section 13 of the variable ratio rack 22. The radius $R_p$ of a pitch circle 14 (shown in FIG. 1 as 14a and FIG. 2 as 14b) and a pressure angle $\Theta_p$ (located between the radius $R_p$ of the pitch circle 14 and the radius $R_b$ of a base circle 16, which is shown in FIG. 1 as 16a and FIG. 2 as 16b) are larger in FIG. 2 than in FIG. 1, resulting in a larger ratio when the sector gear 20 is in mesh with the outer section 13 of the variable ratio rack 22 than when the sector gear 20 is in mesh with the center section 12 of the variable ratio rack 22. Please note that $R_p$, $\Theta_p$, and $R_b$ are shown in FIG. 1 as $R_{p1}$, $\Theta_{p1}$, and $R_{b1}$ and FIG. 2 as $R_{p2}$, $\Theta_{p2}$, and $R_{b2}$, respectively to illustrate the variability of the dimensions. The larger ratio results in a smaller angular movement of the sector gear 20 at the outer section 13 than the angular movement of the sector gear 20 at the center section 12 for any given linear movement of the variable ratio rack 22.

In a recirculating-ball style steering system, variable ratio steering may be achieved by modifying the pressure angle $\Theta_p$ at different locations along the ball-nut rack. Modifying the pressure angle $\Theta_p$ either increases or decreases the radius of the pitch circle 14 in sector gear 20. The pitch circle 14 is an imaginary circle that rolls, without slipping, with a pitch circle of a mating gear. In the case of a rack type gear, an imaginary line known as the pitch line 15 (shown in FIG. 1 as 15a and FIG. 2 as 15b, which illustrates that the position of the pitch line may be variable) corresponds and moves, without slipping, with the pitch circle 14 of the mating circular gear.

The linear velocity of the sector gear 20 at the pitch circle 14 may be represented by the following equation:

$$V = R_p \omega_s$$

Where V is linear velocity of the sector gear 20 at the pitch circle 14, $R_p$ is the radius of the sector gear pitch circle 14, and $\omega_s$ is the angular velocity of the sector gear 20. The velocity of the variable ratio rack 22 at the pitch line 15 will be equal to the linear velocity V of the sector gear 20 at the pitch circle 14, because these are the imaginary paths of the two gears where no slippage is occurring. Therefore, increasing the radius $R_p$ of pitch circle 14 of the sector gear 20 while maintaining a constant linear velocity V of the variable ratio rack 22 will decrease the angular velocity of the sector gear $\omega_s$ and decrease sensitivity of the steering system.

The sensitivity of the steering system is decreased when the radius $R_p$ of the pitch circle 14 is increased and the linear velocity V of the sector gear 20 at the pitch circle 14 remains constant because the ratio between the linear velocity V of the variable ratio rack 22 (which is equal to the velocity of the sector gear at the pitch circle V) and angular velocity of the steering wheel $\omega_w$ is an unchanging constant. Increasing the radius $R_p$ of the pitch circle 14 while maintaining a constant linear velocity V of the variable ratio rack 22, will require a decrease the angular velocity of the sector gear $\omega_s$, while the angular velocity of the steering wheel $\omega_w$ remains constant. Therefore, by increasing the radius $R_p$ of the pitch circle 14, the ratio between the angular velocity of the steering wheel and the angular velocity of the sector gear (the ratio being represented by $\omega_w/\omega_s$) is increased resulting in a decrease in the sensitivity of the steering system.

In order to obtain less sensitive steering when the steering wheel is close to its maximum turning positions, the radius $R_p$ of the pitch circle 14 of the sector gear 20 may be increased when meshing with the outer section 13 of the variable ratio rack 22 as compared to the center section 12 of the variable ratio rack 22. This is achieved by increasing the pressure angle $\Theta_p$ moving from the center section 12 of the variable ratio rack 22 to the outer section 13 of the variable ratio rack 22 by adjusting the respective profiles of the rack-teeth. This is illustrated in FIGS. 1 and 2.

The radius of the pitch circle 14 of the sector gear 20 may be represented by the following equation:

$$R_p = R_b / \cos\Theta_p$$

Where $R_p$ is the radius of pitch circle 14 of the sector gear 20, $R_b$ is the radius of the base circle 16, and $\Theta_p$ is the pressure angle. The base circle 16 is the circle from which the involute profiles of the sector teeth are derived. The pressure angle $\Theta_p$ is the angle between a first line and second line. The first line being the radius $R_p$ of the pitch circle 14 drawn from the center of the sector gear 20 to the contact point between the meshing teeth of the sector gear 20 and variable ratio rack 22, the second line being the radius $R_b$ of the base circle 16 drawn from the center point of the sector gear 20 to a point on the base circle 16 where the line tangent to the base circle at that point is perpendicular the radius $R_b$ of the base circle 16 and the tangent line intersects the contact point between the meshing teeth of the sector gear 20 and variable ratio rack 22. The tangent line from the base circle 16 that intersects the contact point between the meshing teeth of the sector gear 20 and variable ratio rack 22 is also know at the line of pressure 17 (shown in FIG. 1 as 17a and FIG. 2 as 17b, to illustrate that the position of the line of pressure may be variable) and defines the direction of force between the meshing set of teeth.

Figure 3:
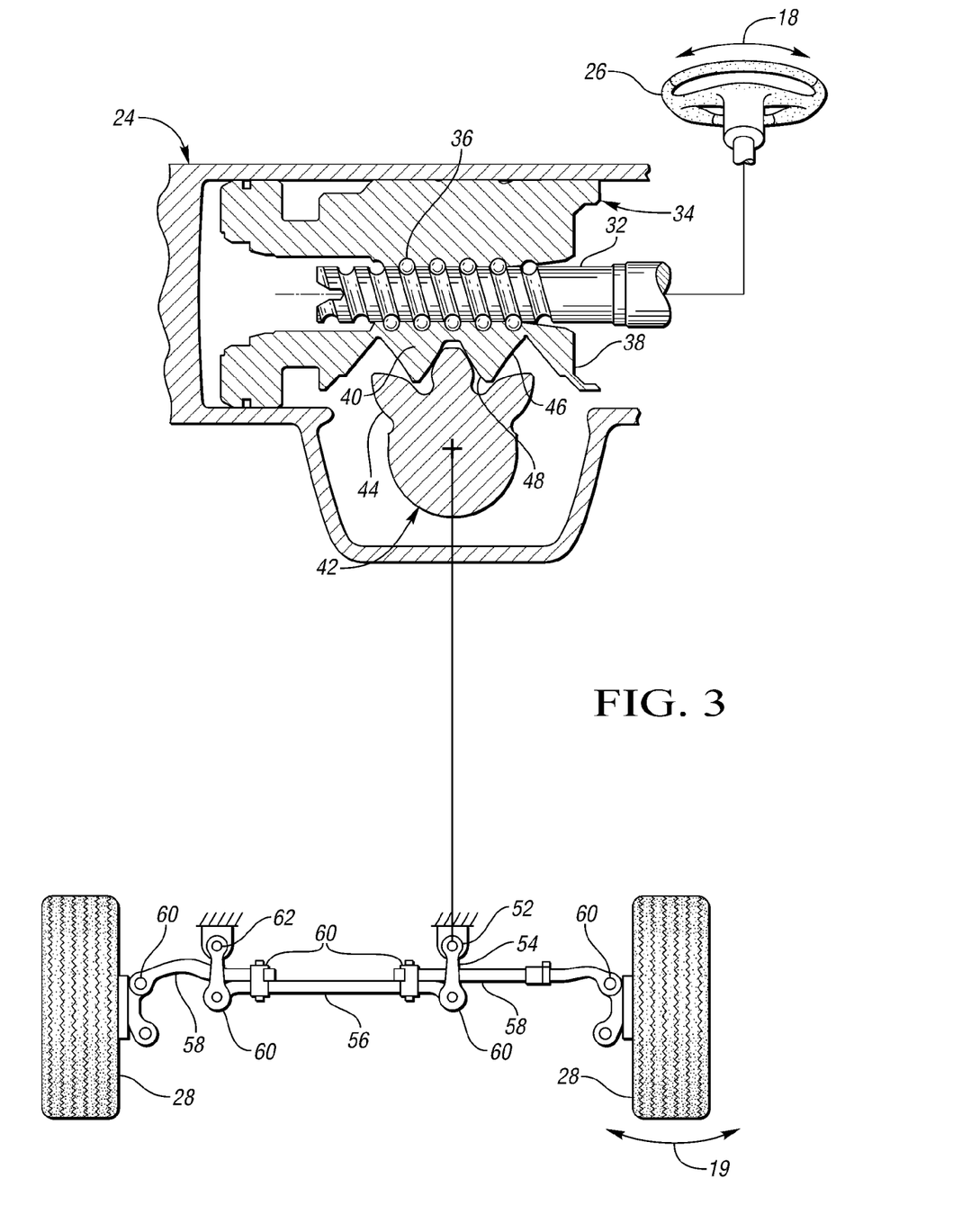
FIG. 3 is a diagrammatic cross-sectional view of a recirculating-ball style steering gearbox, illustrating the linking between the gearbox and a steering wheel, and the linking between the gearbox and steerable road wheels of an automobile.

Referring to FIG. 3, a cross sectional view of a recirculating-ball style steering gearbox 24 is illustrated. The recirculating-ball style steering gearbox 24 creates a mechanical linkage between the steering wheel 26 and steerable road wheels 28 of a vehicle. The recirculating-ball style steering gearbox 24 translates the rotational movement 18 of a steering wheel 26 to a pivoting movement 19 of the road wheels 28.

The recirculating-ball style steering gearbox 24 includes a worm gear 32 which is rotatably linked the steering wheel 26. When the steering wheel 26 is rotated, the worm gear 32 also rotates. The worm gear is linked to a ball-nut 34, which is also encompassed in the recirculating-ball style steering gearbox 24. Rotational motion of the worm gear 32 translates into linear motion of the ball-nut 34. The worm gear 32 is similar to a ball-screw, the threads are filled with ball bearings 36 that recirculate through the worm gear 32 and ball-nut 34 as the worm gear 32 turns. The ball bearings 36 are used to reduce friction and unwanted excess clearance between the worm gear 32 and the ball-nut 34.

Also included in the recirculating-ball style steering gearbox 24 is a variable ratio rack 38 that has rack-teeth 40, and a tapered sector gear 42 that has involute-teeth 44 which are in mesh with the rack-teeth 40. The illustrated variable ratio rack 38 is an integral part of the ball-nut 34. The rack-teeth 40 provide variable ratio steering by adjusting radius of the pitch circle $R_p$ of the tapered sector gear 42 and the pressure angle $\Theta_p$ between the tapered sector gear 42 and variable ratio rack 38, as shown in FIGS. 1 and 2. Adjustment of the pitch circle $R_p$ of the tapered sector gear 42 and the pressure angle $\Theta_p$ between the tapered sector gear 42 and variable ratio rack 38 is accomplished because at least one of the rack-teeth 40 has a concave meshing surface 46 on a first side and a convex meshing surface 48.

The tapered sector gear 42 is connected to a sector shaft 50 (the sector shaft 50 can be seen FIG. 4), which is also incorporated into the recirculating-ball style steering gearbox 24. The tapered sector gear 42 and sector shaft 50 are fixed together and provide a pivot point 52 that is grounded relative to the vehicle. A pitman arm 54 is pivotally linked at one end to the sector shaft. The other end of the pitman arm 54 is pivotally linked to a track rod 56 which is pivotally linked to tie rods 58 and the road wheels 28 through a series of pivot points 60. A second grounded pivot point 62 is provided to ensure system stability.

Figures 4, 5:
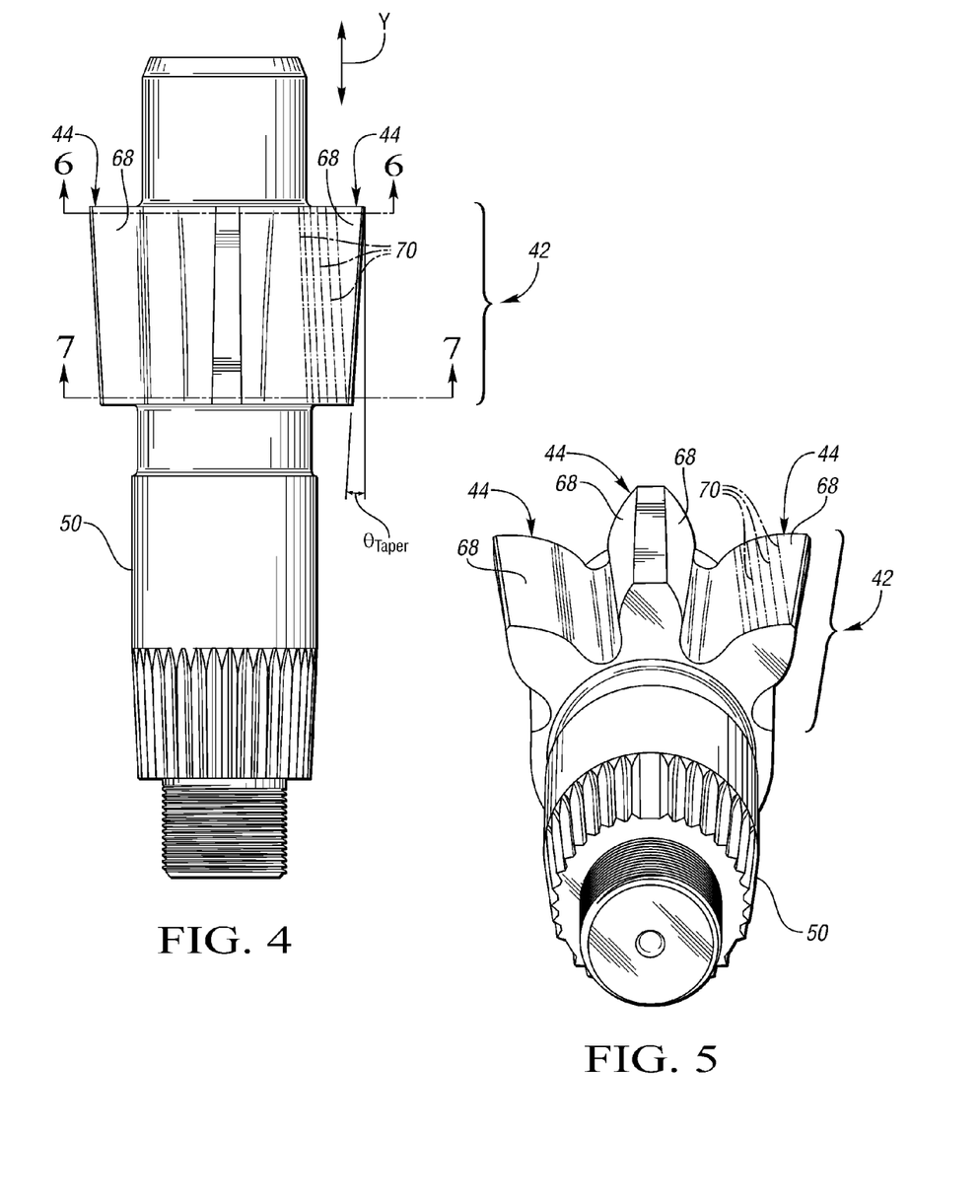
FIG. 4 is a front view of a tapered sector gear and sector shaft, illustrating helical contact lines.
FIG. 5 is an isometric bottom front view of the tapered sector gear and sector shaft of FIG. 4, illustrating the helical contact lines.
Figure 6:
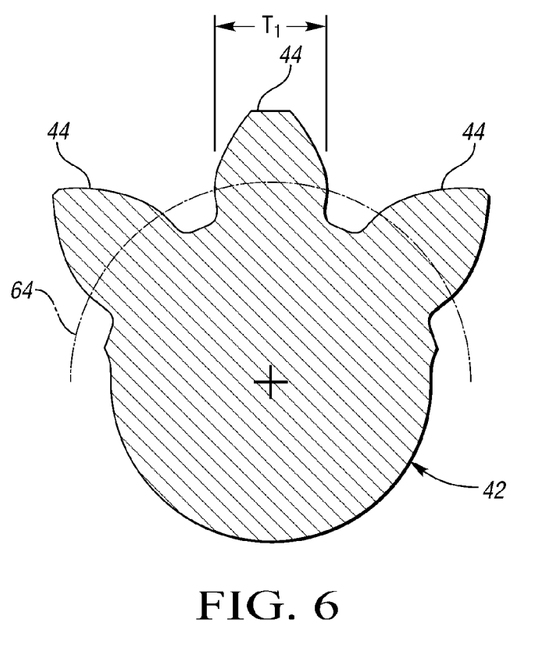
FIG. 6 is a cross-sectional view taken along the line 6-6 of FIG. 4.
Figure 7:
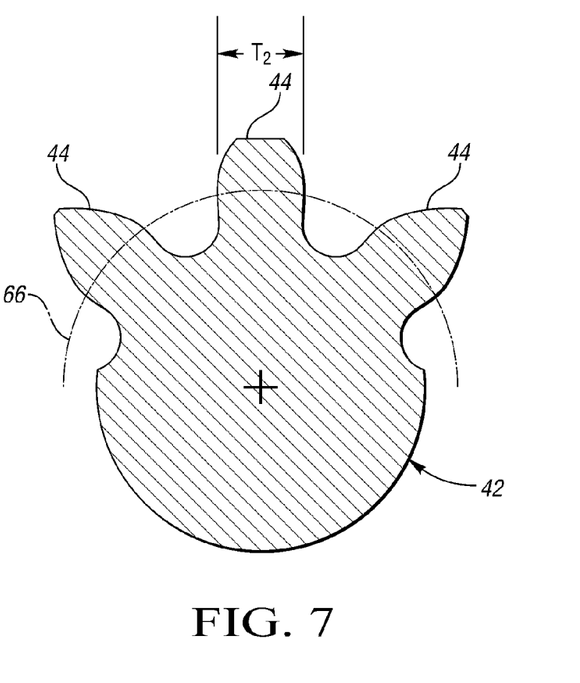
FIG. 7 is a cross-sectional view taken along the line 7-7 of FIG. 4.

As illustrated in FIG. 4, the involute-teeth 44 of the tapered sector gear 42 are tapered as you move in a Y direction. The taper creates a variable tooth thickness which can be observed by the cross-sections taken along lines 6-6 and 7-7 of FIG. 4 and illustrated in FIGS. 6 and 7. The center tooth has a tooth thickness $T_1$ at a first pitch circle 64 in the cross section of FIG. 6 that is greater than the tooth thickness $T_2$ at a second pitch circle 66 in the cross section of FIG. 7. It should also be observed that the thicknesses of the other two teeth of the tapered sector gear 42 also decrease with the taper, and each tooth has a thickness which is smaller in the cross-section of FIG. 7 than in the cross-section of FIG. 6.

It should further be noted that the tapered sector gear 42 illustrated includes three involute teeth, but the disclosure should not be construed as limited to sector gears with only three involute teeth, but should include sector gears with more or less than 3 involute-teeth.

A mesh load between the tapered sector gear 42 and variable ratio rack 38 may be modified by adjusting the position of the tapered sector gear 42 longitudinally in the Y direction relative to the variable ratio rack 38. Adjusting the tapered sector gear 42 in the Y direction relative to the variable ratio rack 38, allows adjustment of the mesh load because the taper of the involute-teeth 44 creates variable thicknesses either creating a loose or tight fit between the involute-teeth 44 and the rack-teeth 40 depending on the longitudinal position of the sector gear.

Referring to FIGS. 4 and 5, the involute-teeth 44 of the tapered sector gear 42 have meshing surfaces 68 that contact the rack-teeth 40 along an array of helical meshing lines 70 that extend across the meshing surfaces 68. The helical meshing lines 70 have leads that decrease in length as you move outward radially along the meshing surfaces 68.

Figure 8:
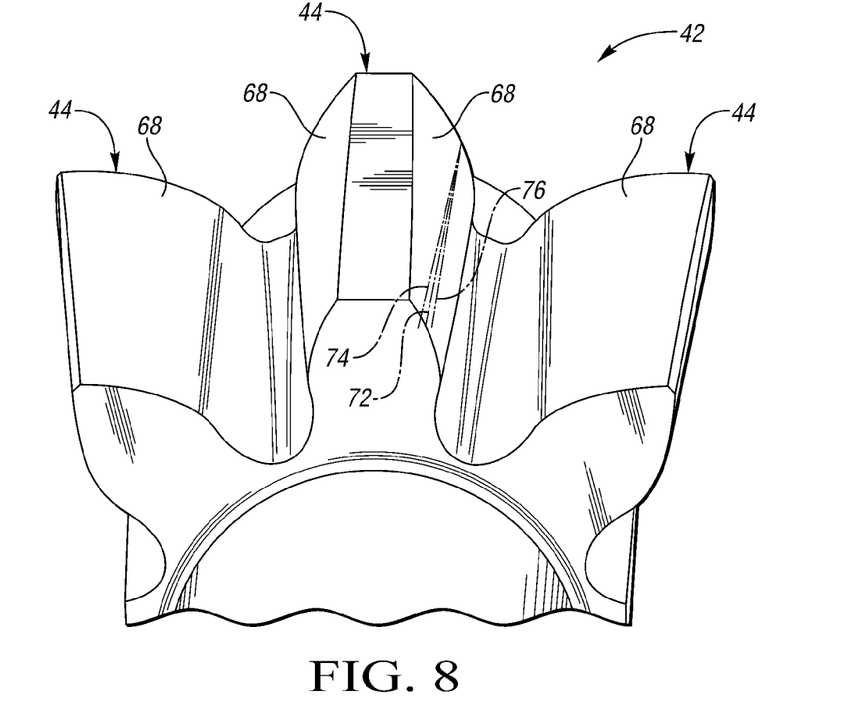
FIG. 8 is a partial isometric view of a tapered sector gear illustrating the effect of an increase or decrease in the lead of a helical contact line.

FIG. 8 illustrates how either increasing or decreasing the leads of the helical meshing lines 70 affects the meshing surfaces 68 the involute-teeth 44. A helical meshing line 72 calculated from a standard tooth form is shown in between two other helical meshing lines that have lead values that deviate from the standard tooth form. A helical line with a reduced lead value 74 will pull the tooth face inward to create addition clearance between the involute-teeth 44 of the tapered sector gear 42 and the rack-teeth 40 of the variable ratio rack 38. A helical line with an increased lead value 76 will pull the tooth face outward reducing clearance between the involute-teeth 44 of the tapered sector gear 42 and the rack-teeth 40 of the variable ratio rack 38, which may be required to fill any gaps between the involute-teeth 44 and rack-teeth 40.

Figure 9:
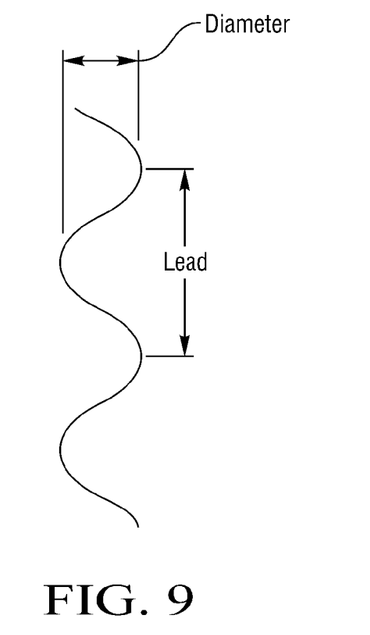
FIG. 9 is a diagrammatic side view of a helical line illustrating the diameter and lead dimensions of the helical line.
Figure 10:
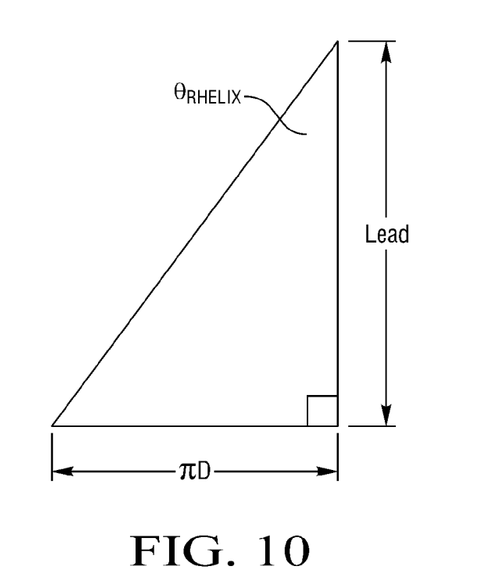
FIG. 10 is a diagram illustrating a right triangle created when a helical line is pulled into a straight line at its angle of incline for one complete revolution.

Referring to FIGS. 9 and 10, the basic dimensions of helical lines are illustrated. The lead of a helical line (or helix) is the vertical dimension of one revolution of the helix, as can be seen in FIG. 9. The lead of the helix may also be represented as the vertical leg of a right triangle that is created if you pulled the helix into a straight line at its angle of incline for one complete revolution. The short leg of the triangle would be the equal to π times the diameter of the helix D (or πD). The angle between the lead and the hypotenuse of the triangle is known as the rolling helix angle $\Theta_{rhelix}$. The mathematical equation representing lead value of helix in the array helical meshing lines 70 of the involute-teeth 44 of the tapered sector gear 42 is represented by the following equation:

$$Lead = \left[\frac{\pi D}{\tan\theta_{rhelix}}\right]$$

Where D is diameter of a helix that is one helix in the array of helical meshing lines 70 and $\Theta_{rhelix}$ is the rolling helix angle.

The mathematical equation representing the rolling helix angle $\Theta_{rhelix}$ of one helix in the array helical meshing lines 70 of the involute-teeth 44 of the tapered sector gear 42 is represented by the following equation:

$$\Theta_{rhelix} = \tan^{-1}(\tan\Theta_p \tan\Theta_{taper})$$

Where $\Theta_p$ is pressure angle between the tapered sector gear 42 and variable ratio rack 38 and $\Theta_{taper}$ is the taper angle of the involute-teeth 44 of the tapered sector gear 42 ($\Theta_{taper}$ is illustrated in FIG. 4).

Utilizing the foregoing equations, the leads of the helical meshing lines 70 of the sector gear 42 are decreased in length as you move outward radially along the meshing surfaces 68. The decrease of the helical leads as you outwardly radially along the meshing surfaces 68 corresponds to an increase in steering ratio and increase in pressure angle $\Theta_p$ between the sector gear 42 and variable ratio rack 38. The leads may range from 6500 mm to 2000 mm from the most radially inward helical meshing line to the most radially outward helical meshing line line, but preferably the leads range from 4500 mm to 3000 mm from the most radially inward helical meshing line to the most radially outward helical line. The lengths of the leads may decrease as linear function as you move radially outward across the meshing surfaces 68 of the involute-teeth 44; or the lengths of the leads may decrease in steps as you move radially outward across the meshing surfaces 68 of the involute-teeth 44. The decrease in the lengths of the leads at each step may range from 50 mm to 350 mm as you move radially outward across the meshing surfaces 68 of the involute-teeth 44, but preferably, the lengths of the leads decrease by 150 mm to 250 mm at each step as you move radially outward across the meshing surfaces 68 of the involute-teeth 44.

Decreasing the leads of the helical meshing lines 70 as you move radially outward along the meshing surfaces 68 creates addition clearance between the involute-teeth 44 of the tapered sector gear 42 and the rack-teeth 40 of the variable ratio rack 38. This additional clearance eliminates interference that would otherwise occur between a tapered sector gear and a variable ratio rack. The combination of a tapered sector gear and variable ratio rack in a recirculating-ball style steering system, allows for variable ratio steering, precise and cost effective setting of initial gear mesh load, and the ability for future adjustment of the mesh load during the life of the vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A recirculating-ball style steering gearbox comprising:
   a rack having rack-teeth capable of providing variable ratio steering; and
   a tapered sector gear having involute-teeth in mesh with the rack-teeth, each involute-tooth having an array of helical meshing lines extending across a meshing surface, wherein the array of helical meshing lines has lead dimensions that decrease in length moving radially outward across the meshing surface.

2. The recirculating-ball style steering gearbox of claim 1, wherein a mesh load between the tapered sector gear and rack is modifiable by adjusting a position of the sector gear longitudinally.

3. The recirculating-ball style steering gearbox of claim 1, wherein the lengths of the leads decrease in steps.

4. The recirculating-ball style steering gearbox of claim 3, wherein the lengths of the leads decrease by 100 mm to 300 mm at each step.

5. The recirculating-ball style steering gearbox of the claim 1, wherein the tapered sector gear has 3 involute-teeth.

6. The recirculating-ball style steering gearbox of claim 1, wherein linear movement of the rack is rotatably linked to a steering wheel of a vehicle via a worm gear and ball-nut.

7. The recirculating-ball style steering gearbox of claim 1, wherein the tapered sector gear is pivotally linked to steerable road wheels of an automobile.

8. A sector gear for a recirculating-ball style steering system comprising:
   at least one tapered involute-tooth having a meshing surface capable of contacting variable ratio rack teeth along an array of helices, the helices having lead dimensions that decrease in length moving radially outward across the meshing surface.

9. The sector gear of claim 8, wherein a mesh load between the sector gear and a variable ratio rack is modifiable by adjusting a position of the sector gear longitudinally.

10. The sector gear of claim 8, wherein the lengths of the leads decrease in steps.

11. The sector gear of claim 10, wherein the lengths of the leads decrease by 100 mm to 300 mm at each step.

12. The sector gear of claim 8, wherein the sector gear has 3 involute-teeth.

13. A gearbox comprising:
   a rack having a least one rack-tooth with a concave meshing surface on a first side and a convex meshing surface on a second side; and
   a tapered sector gear having at least one involute-tooth with a first tooth thickness at a first pitch circle adjacent a first side of the tooth larger than a second tooth thickness at a second pitch circle adjacent a second side of the tooth, wherein the at least one involute-tooth has an array of helical meshing lines extending across a sector tooth meshing surface, the array of helical meshing lines having lead dimensions that decrease in length moving radially outward across the sector tooth meshing surface.

14. The gearbox of claim 13, wherein a mesh load between the tapered sector gear and rack is modifiable by adjusting a position of the sector gear longitudinally.

15. The gearbox of claim 13, wherein the lengths of the leads decrease in steps.

16. The gearbox of claim 15, wherein the lengths of the leads decrease by 100 mm to 300 mm at each step.

17. The gearbox of claim 13, wherein the tapered sector gear has 3 involute-teeth.

* * * * *